(12) United States Patent
Hartley

(10) Patent No.: US 7,024,847 B2
(45) Date of Patent: Apr. 11, 2006

(54) MOWER DECK

(75) Inventor: Dean E. Hartley, Burlington, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/158,080

(22) Filed: May 31, 2002

(65) Prior Publication Data

US 2003/0221405 A1 Dec. 4, 2003

(51) Int. Cl.
*A01D 67/00* (2006.01)

(52) U.S. Cl. .................................. 56/320.1; 56/255

(58) Field of Classification Search ............ 56/14.7, 56/16.7, 17.3, 255, 295, 320.1, DIG. 5
See application file for complete search history.

(56) References Cited

U.S. PATENT DOCUMENTS

| | | | | |
|---|---|---|---|---|
| 2,836,024 A | * | 5/1958 | Davis et al. ................... | 56/255 |
| 3,242,660 A | * | 3/1966 | Gary ............................ | 56/255 |
| 3,538,692 A | * | 11/1970 | Cope et al. .................... | 56/295 |
| 3,959,954 A | * | 6/1976 | Halsten ........................ | 56/255 |
| 4,083,166 A | * | 4/1978 | Haas ........................... | 56/13.7 |
| 4,189,904 A | * | 2/1980 | Paker .......................... | 56/255 |
| 4,205,512 A | | 6/1980 | Thorud | |
| 4,320,617 A | * | 3/1982 | Fedeli ......................... | 56/295 |
| 4,890,446 A | * | 1/1990 | Israel ......................... | 56/255 |
| 4,938,011 A | * | 7/1990 | Pernia ........................ | 56/255 |
| 4,951,449 A | | 8/1990 | Thorud | |
| 5,133,176 A | | 7/1992 | Baumann et al. | |
| 5,191,756 A | * | 3/1993 | Kuhn .......................... | 56/17.5 |
| 5,210,998 A | | 5/1993 | Hojo et al. | |
| 5,212,938 A | | 5/1993 | Zenner et al. | |
| 5,269,127 A | * | 12/1993 | Miles, Jr. ..................... | 56/255 |
| 5,305,589 A | | 4/1994 | Rodriguez et al. | |
| 5,345,788 A | * | 9/1994 | Jerry .......................... | 56/255 |
| 5,465,564 A | * | 11/1995 | Koehn et al. .............. | 56/320.2 |
| 5,488,821 A | * | 2/1996 | McCunn et al. ........... | 56/320.2 |
| 5,581,987 A | * | 12/1996 | Schuyler ..................... | 56/255 |
| 5,638,667 A | | 6/1997 | Ellson et al. | |
| 6,062,013 A | * | 5/2000 | Wolske ....................... | 56/295 |
| 6,571,543 B1 | * | 6/2003 | Nunes, Jr. ................. | 56/320.1 |

* cited by examiner

*Primary Examiner*—Árpád Fábián Kovács
(74) *Attorney, Agent, or Firm*—Jenkins, Wilson, Taylor & Hunt, P.A.

(57) ABSTRACT

A mower deck includes a cutting chamber, at least one blade mounted cutting chamber and at least one deflector mounted in the cutting chamber. The at least one deflector is semi-permeable to clippings circulating in the cutting chamber.

27 Claims, 3 Drawing Sheets

MOWER DECK

BACKGROUND OF THE INVENTION

Conventional lawnmowers typically employ one of the three methods to process the clippings. The first method is to discharge the clippings onto the lawn using a discharging mower. This permits nutrients to return to the soil. However, in most cases, discharging mowers expel the clippings on top of the grass along a row (called "windrow"). Because the clippings are left on top of the grass, the clippings will not efficiently decompose and return nutrients to the soil. These windrows can mar the aesthetics of a freshly manicured lawn. If the windrows are heavy, then they can even cause the grass over which they lie to turn brown, further detracting from the appearance and health of the lawn.

The second method of processing the clippings includes discharging the clippings into a collection bag attached to a discharging mower. The collection bag is attached to the outlet of the mower's discharge chute. Bagging the clippings prevents the formation of windrows on the lawn. However, the lawnmower operator must make frequent stops to empty the bag. Disposing the bagged clippings places an additional burden on the operator.

These first two methods can create additional maintenance requirements for the lawnmower when cutting heavy and/or wet vegetation. The clippings can collect in the deck housing and randomly drop on the lawn in large clumps. The clippings can also collect in the discharge chute and ultimately block the discharge chute. The operator must then stop the lawnmower and clean out the discharge chute.

The third method offers solutions to the disadvantageous first and second methods. In the third method, the clippings are cut into fine pieces using a mulching mower so that they are much smaller than those produced by discharge mowers using either of the other two methods. A mulching mower provides several advantages over discharging mowers. For example, the clippings are small enough to be blown below the surface of the lawn. This enables the elimination of the discharge chute, thus simplifying the design and manufacture of the lawnmower and reducing the operator's maintenance activities while mowing. Mulching also minimizes the effect of the clippings on the aesthetics of the lawn because the grass is deposited on the lawn across a significantly wider area. This at least minimizes the windrow effect. The mulching process forces the clippings below the top of the grass so that the rate of re-absorption of nutrients into the soil increases as compared to a regular discharging mower that merely deposits the clippings on top of the grass. U.S. Pat. No. 5,210,998 discloses a typical mulching mower and is incorporated into this application by reference.

Mulching mowers suffer from a problem in which the clippings hover above the cutting blade, circulate inside the deck housing and collect on the deck housing. This can cause the deck housing to become clogged and distribute the clippings unevenly onto the lawn.

Recent attempts to solve this problem resulted in obstructions mounted in the deck housing to redirect the circulation path of the clippings back toward the blade for mulching and depositing in the lawn. Typically, these obstructions involve complicated shapes and require specific positioning within the deck housing to ensure proper performance.

SUMMARY OF THE INVENTION

The present invention provides a mower deck including a cutting chamber, at least one blade mounted in the cutting chamber and at least one deflector mounted in the cutting chamber. The at least one deflector is semi-permeable to clippings circulating in the cutting chamber.

There is also provided a lawnmower convertible between a mulching mode and a discharge mode. The convertible lawnmower includes a deck having a skirt and a cutting chamber. The cutting chamber includes a roof. The convertible lawnmower also includes a discharge chute having an opening into the cutting chamber, a blade rotatably mounted in the cutting chamber and a semi-permeable deflector extending into the cutting chamber from the skirt.

There is yet also provided a method for mulching grass with a lawnmower. The method includes forming a barrier of clippings on a deflector in a circulation path of a cutting chamber and cutting the clippings diverted by the barrier of clippings.

There is further provided a mower deck including a cutting chamber, at least one blade mounted in the cutting chamber, and means for forming a barrier of clippings to divert clippings circulating in the cutting chamber.

BRIEF DESCRIPTION OF THE DRAWINGS

The accompanying drawings, which are included to provide a further understanding of the invention and are incorporated in and constitute part of this specification, illustrate preferred embodiments of the invention and together with the description serve to explain the principles of the invention.

DETAILED DESCRIPTION OF THE PREFERRED EMBODIMENTS

Figure 1:
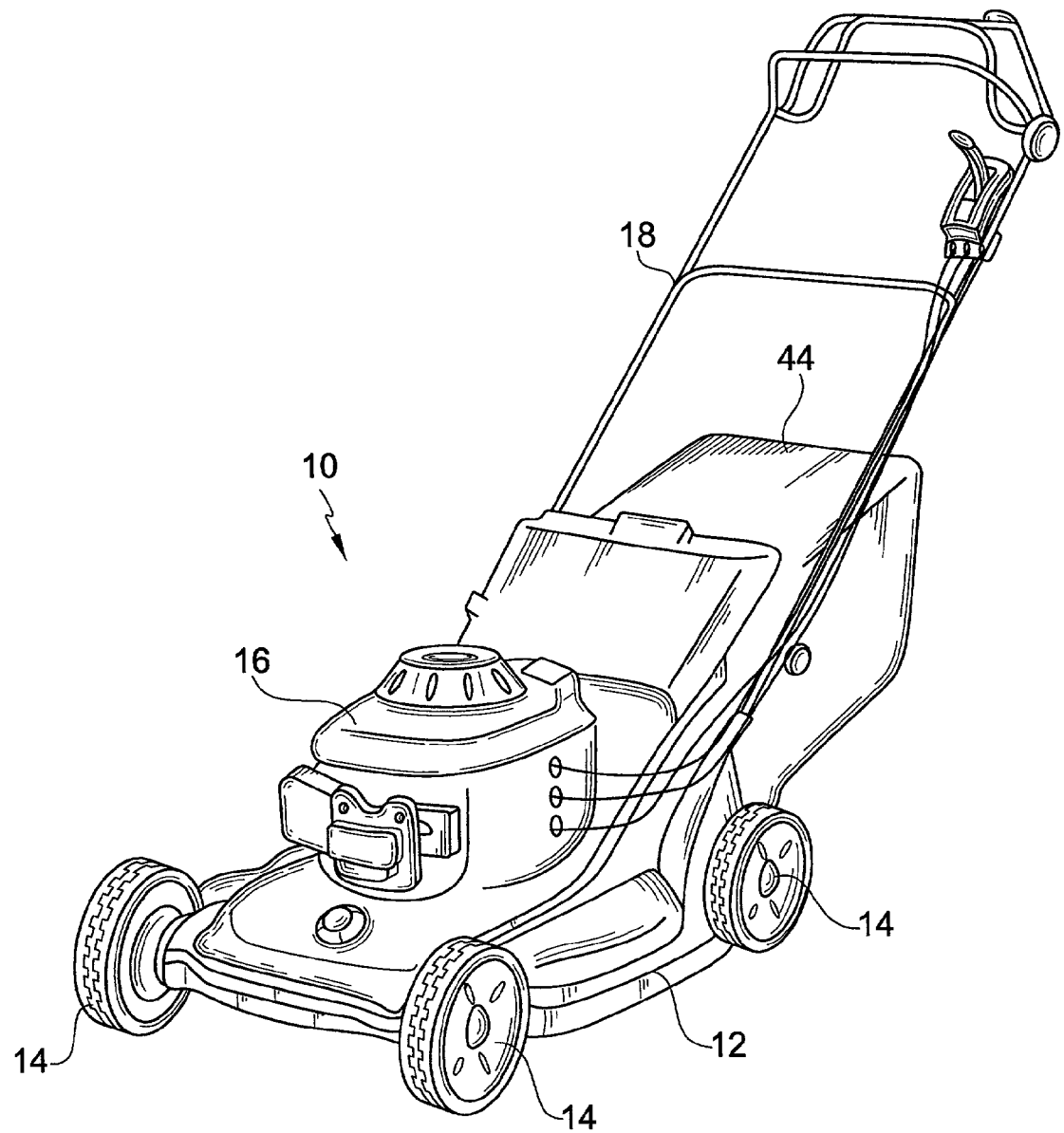
FIG. 1 is a perspective view of a lawnmower according to the invention.

FIG. 1 illustrates a lawnmower 10 that includes a deck 12, wheels 14 supporting the deck 12 above the lawn, a prime mover 16 mounted on top of the deck 12 and a handle 18 extending up from the deck 12. Preferably, the prime mover 16 is a gasoline powered internal combustion engine, but other types of prime movers are possible such as electric motors and hydraulic motors.

Figure 2:
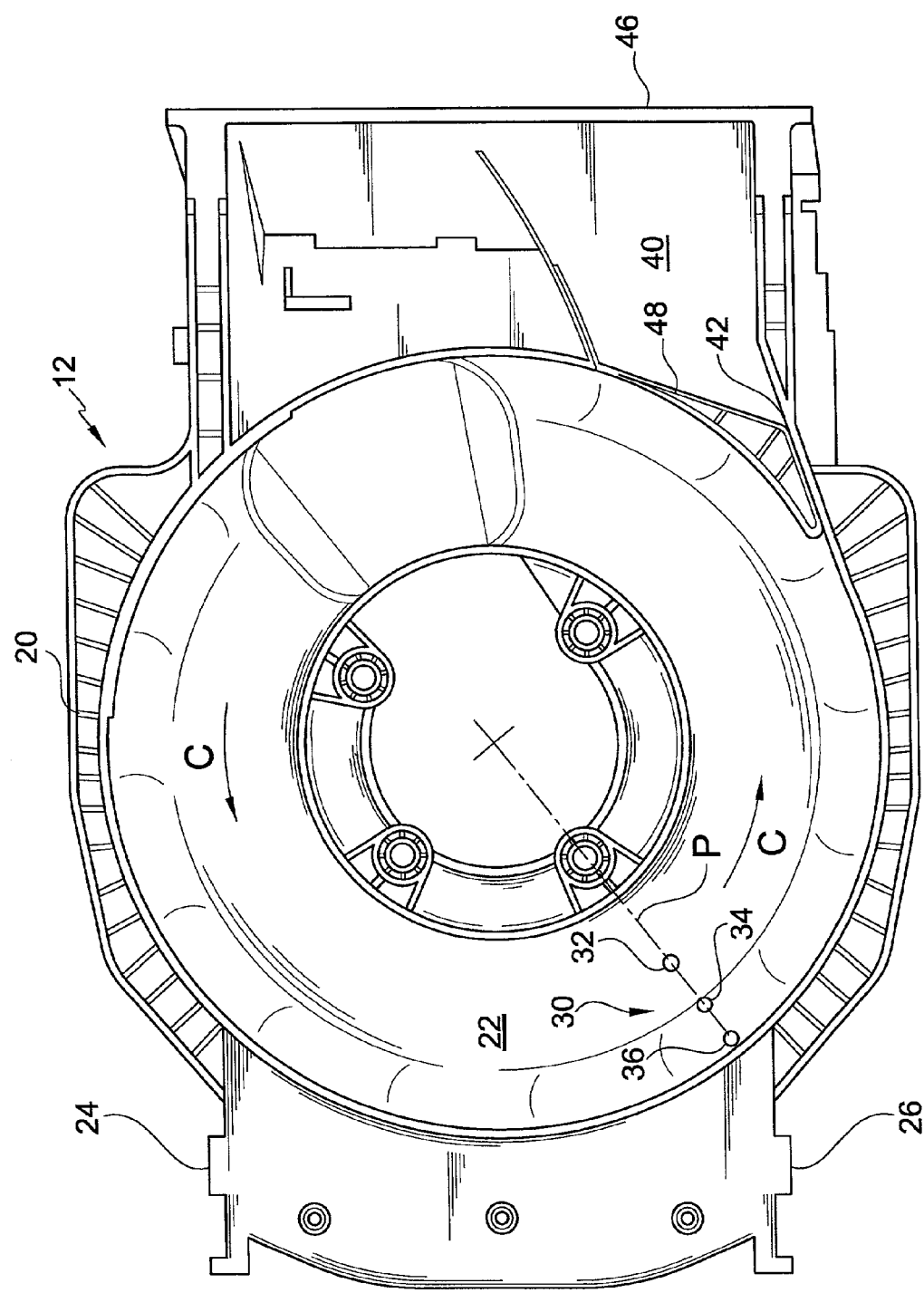
FIG. 2 is a plan view of the bottom of the deck shown in FIG. 1 having a first embodiment of a deflector.
Figure 3:
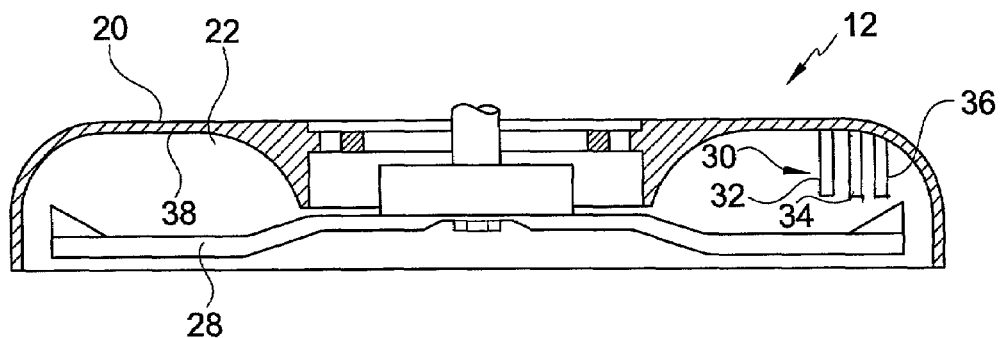
FIG. 3 is a cross-sectional view of a mower deck of the lawnmower shown in FIG. 2.

Referring to FIGS. 2 and 3, the deck 12 includes a skirt 20 extending outwardly and downwardly from the prime mover 16 (omitted from FIGS. 2 and 3). The skirt 20 defines a cutting chamber 22. A mulching blade 28 (FIG. 3) is connected to the prime mover 16 and rotates within the cutting chamber 22. In operation, the mulching blade 28 forces the clippings upward and circulates them around the cutting chamber 22 along a circulation path C (FIG. 2). The blade 28 can be configured as a single cutting element or as multiple cutting elements. More than one mulching blade 28 can be provided in the case of large swath decks such as those used with garden tractors, riding mowers and commercial walk-behind mowers.

A deflector 30 is mounted on the skirt 20. The deflector 30 is semi-permeable to the clippings circulating in the deck such that some of the clippings pass through the deflector 30 and some of the clippings collect onto the deflector 30, as will be explained below.

The deflector 30 preferably includes three spaced-apart deflector elements 32, 34, 36. The deflector elements 32, 34, 36 project into the circulation path C of the grass clippings so that some of the clippings collect on each of the deflector elements 32, 34, 36 while the remaining clippings pass around the deflector elements 32, 34, 36 and between the spaces separating the deflector elements 32, 34, 36. As the volume of clippings gathering on the deflector elements 32, 34, 36 increases, the clippings form a semi-permeable barrier projecting into the circulation path C. The permeability to clippings of the clippings barrier is less than the permeability to clippings of the deflector 30.

The clippings barrier slows the velocity of the grass clippings still circulating in the cutting chamber 22. This reduction in velocity causes the circulating clippings to fall from the circulation path C and pass back across the blade 28 where they are mulched and deposited below the surface of the freshly mowed lawn.

It has been found that a preferred performance of the deflector 30 occurs when the clippings accumulate on the deflector elements 32, 34, 36 so that at least a small clearance remains between the clippings gathered on each of the deflector elements 32, 34, 36. That is, blanketing of the deflector 30 by the clippings to create a solid clippings barrier can adversely affect the flow of the circulating clippings so that they are not sufficiently mulched by the blade 28. For example, blanketing of the deflector 30 can divert an excessive amount of clippings to fall across the blade 28 such that the prime mover 16 can become overloaded and stall by the excessive amount of clippings or the clippings will be deposited on top of the freshly cut lawn surface and plainly visible because the blade 28 cannot blow the excessive amount of clippings below the freshly cut lawn surface.

To minimize the likelihood of blanketing of the deflector 30, the deflector elements 32, 34, 36 are preferably spaced from each other by a distance approximately equal to twice the cross-sectional thickness of the deflector element 32, 34, 36 as seen by the circulating clippings. In the case of a cylindrical deflector element, for example, the spacing between each deflector element 32, 34, 36 is approximately equal to twice the diameter of one of the deflector elements 32, 34, 36. This relationship between the thickness and spacing of the deflector elements 32, 34, 36 should ensure that the deflector 30 will not become blanketed with clippings.

It is preferred to use three deflector elements 32, 34, 36. However, different numbers of deflector elements 32, 34, 36 can be used in combination with different sizes, shapes and relative orientations of the deflector elements 32, 34, 36 to achieve the desired result. If the number of deflector elements 32, 34, 36 is too few, the deflector elements 32, 34, 36 may not collect enough grass clippings to effectively reduce the velocity of the remaining clippings circulating in the cutting chamber 22 so that the circulating clippings fall back across the blade 28 for mulching and depositing below the freshly cut lawn surface. If the number of deflector elements 32, 34, 36 is too many, deflector elements 32, 34, 36 can permit blanketing of the deflector 30 by the circulating clippings.

It is also preferred that the deflector elements 32, 34, 36 extend parallel to one another with the longest deflector element 32 closest to the center of the cutting chamber 22 and the shortest deflector element 36 farthest from the center of the cutting chamber 22. The parallel arrangement of the deflector elements 32, 34, 36 provides the most efficient orientation for collecting the clippings. The deflector elements 32, 34, 36 are oriented in the cutting chamber 22 such that they extend sufficiently into the circulation path C of the grass clippings and define a planar area that is less than the cross-sectional area of the cutting chamber 22 at the location of the deflector 30. The relative length of each deflector element 32, 34, 36 can be such that each deflector element 32, 34, 36 can extend into the cutting chamber 22 to an equal depth (e.g., FIG. 3) or to a depth different from the other two deflector elements (e.g., FIGS. 4 and 5).

In the first embodiment of the deflector 30 as shown in FIGS. 2 and 3, the deflector elements 32, 34, 36 extend approximately vertically from the roof 38 of the cutting chamber 22 toward the blade 28. However, other orientations of the deflector elements 32, 34, 36 are possible, as will be explained below.

As shown in FIG. 2, the deflector elements 32, 34, 36 are aligned vertically such that their longitudinal axes lie in a common plane (dotted line indicated at P). This common plane P can be oriented vertically or at an angle from vertical. Preferably, this common plane P extends along a radius of the cutting chamber 22. However, the common plane P can extend parallel to a radius of the cutting chamber 22 as long as the deflector 30 extends sufficiently far into the circulation path C to collect clippings and divert the remaining clippings to fall across the blade 28.

The longest clippings promote efficient production of the clippings barrier on the deflector 30. Preferably, the deflector 30 is located in the cutting chamber 22 where the highest concentration of the longest clippings is located. The longest clippings circulating in the cutting chamber 22 are the clippings produced where the uncut vegetation first enters the cutting chamber 22 and is cut by the mulching blade 28. This corresponds to the portion of the cutting chamber 22 located between the two front wheel mounts 24, 26 as viewed in FIG. 2.

The arcuate portion of the cutting chamber 22 adjacent to the right front wheel mount 26 will have the highest concentration of fresh clippings because the mulching blade 28 rotates in a counterclockwise direction as viewed in FIG. 2. Accordingly, it is preferred to locate the deflector 30 along a radius of the cutting chamber 22 that extends close to the right front wheel mount 26. Likewise, if the blade rotates in a clockwise direction, then it would be preferred to locate the deflector 30 on the radius of the cutting chamber 22 that extends close to the left front wheel mount 24.

Referring to FIGS. 2 and 3, the deflector elements 32, 34, 36 are shown as cylindrical rods. It has been found that the shape of the deflector elements 32, 34, 36 has a minimal influence on the number of deflector elements 32, 34, 36 desired to meet a specified performance level, yet cylindrical rods provide the most advantageous performance for the deflector 30. However, other shapes for the deflector elements 32, 34, 36 are possible such as rectangular plates or rods with a triangular cross-section.

In the case of rectangular plates, the face of the plates should extend tangentially to the circulation path such that the grass clippings collect on the edge of each plate. The spacing between the plates is preferred to be approximately twice that of the thickness of one of the plates.

In the case of triangular rods, with a vertex of each rod pointing in a direction tangential to the circulation path of the clippings, a narrowing passage exists between each deflector element. This orientation provides a less desirable operation of the deflector because the clippings can become tightly wedged into the narrowing passage. The minimum spacing between each of the triangular deflector elements is preferred to be approximately twice that of the height of the triangular cross-section.

Since the deflector 30 retards the velocity of the grass clippings circulating in the cutting chamber 22, it is preferred to use one deflector 30. More than one deflector 30 spaced apart within the cutting chamber 22 can retard the velocity of the clippings too much. This can adversely affect the mulching performance of the blade 28 because the deflectors 30 divert too many grass clippings to fall back across the blade 28. The blade 28 may not be able to mulch all of these clippings or the load placed on the blade 28 by the excessive amount of clippings will over power the prime mover 16 and cause it to stall. Also, the volume of clippings can reach a large value if too many deflectors 30 are used. This can cause unwanted clumping of the grass clippings within the cutting chamber 22 and/or on the freshly mowed lawn.

The lawnmower 10 is convertible between a mulching mode and a discharge/bagging mode and, as shown in FIG. 2, the deck 12 includes a discharge chute 40 with an inlet 42 opening into the cutting chamber 22. The discharge chute 40 has an outlet 46 that opens toward the rear of the deck 12. Alternately, the opening 46 can be oriented to open toward the side of the deck 12. A collection bag 44 (FIG. 1) can be secured to the outlet 46 of the discharge chute 40 or the clippings can be deposited onto the freshly cut lawn through the outlet 46. The deflector elements 32, 34, 36 can be connected to the cutting chamber 22 such that the deflector 30 can retract relative to the cutting chamber 22 to facilitate the conversion of the mower between the mulching mode and the discharge/bagging mode.

Referring to FIG. 2, to prevent clippings from exiting the cutting chamber 22 before they are adequately mulched, a removable plug 48 can be placed in the discharge chute 40 to block the inlet 42 of the discharge chute 40. The lawnmower 10 can be easily and quickly converted into a bagging mower or a regular discharging mower simply by removing the plug 48 from the discharge chute 40. In the case of the bagging mower, the collection bag 44 is preferably connected to the discharge chute outlet 46. By movably mounting the deflector elements 32, 34, 36 relative to the cutting chamber 22 as discussed above, the deflector 30 can be moved away from the circulation path C so that no mulching of the clippings occurs when the lawnmower 10 is in the discharge mode.

Figure 4:
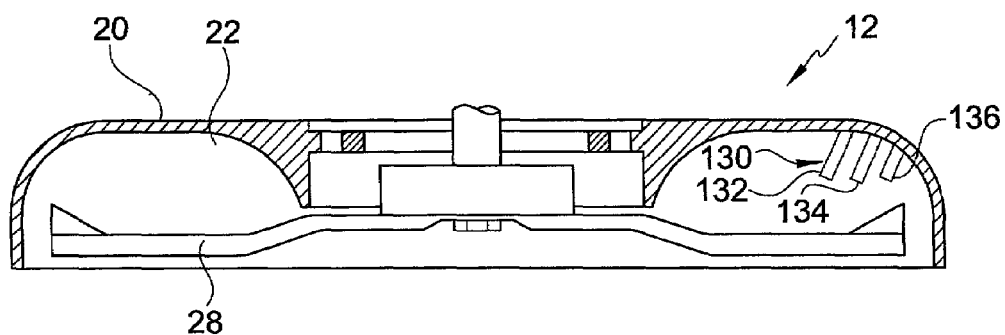
FIG. 4 is a cross-sectional view of a mower deck of the lawnmower shown in FIG. 1 having a second embodiment of a deflector.
Figure 5:
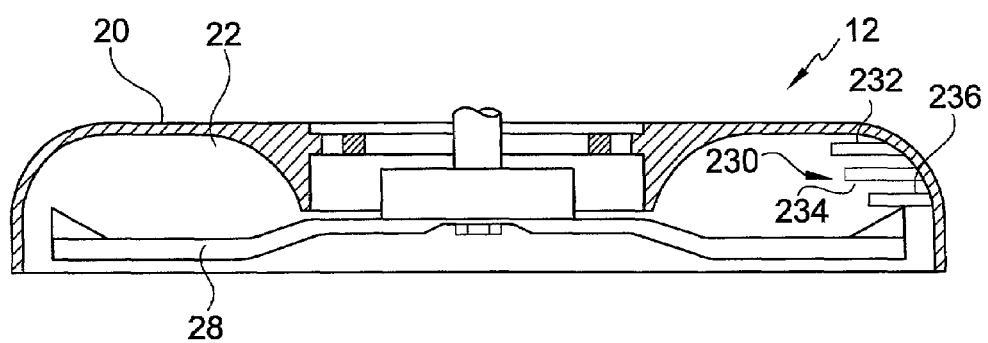
FIG. 5 is a cross-sectional view of a mower deck of the lawnmower shown in FIG. 1 having a third embodiment of a deflector.

FIGS. 4 and 5 each illustrate another possible orientation of the deflector elements. Like FIG. 3, the prime mover 16 has been omitted. FIG. 4 illustrates a second embodiment of the deflector 130 with the deflector elements 132, 134, 136 extending at an angle from vertical with the longest deflector element 132 closest to the center of the cutting chamber and the shortest deflector element 136 farthest from the center of the cutting chamber 22. FIG. 5 illustrates a third embodiment of the deflector 230 with the deflector elements 232, 234, 236 extending approximately horizontally above the blade 28. The longest deflector element 232 is positioned closest to the roof 38 and the shortest deflector element 236 is located closest to the blade 28. This approximately horizontal orientation performs less effectively than the orientations shown in FIGS. 2 and 3. As with the first embodiment of the deflector 30 shown in FIGS. 2 and 3, the alternate embodiments of the deflector element 130, 230 shown in FIGS. 4 and 5 include three cylindrical deflector elements 132, 134, 136; 232, 234, 236 that are spaced apart by a distance approximately equal to twice the diameter of the deflector elements 132, 134, 136; 232, 234, 236. Like the first embodiment, the size, shape and number of deflector elements can vary to meet a desired performance. Preferably, the alternate embodiment deflectors 130, 230 are aligned along the common plane P, as described above with respect to FIG. 2.

Although the preferred embodiments described above are associated with a walk-behind mover, the present invention can be equally applied to a floating deck such as those used with garden tractors, riding mowers and commercial walk-behind mowers.

It will be apparent to those skilled in the art that various modifications and variations can be made in the mower deck of the present invention without departing from the spirit or scope of the invention. Thus, it is intended that the present invention covers the modifications and variations of this invention provided they come within the scope of the appended claims and their equivalents.

I claim:

1. A mower deck comprising:
   (a) a cutting chamber;
   (b) at least one blade mounted in the cutting chamber for cutting grass; and
   (c) a deflector detached from the blade and mounted in the cutting chamber and extending across the blade at a position above the blade, the deflector being semi-permeable to clippings and comprising a plurality of spaced-apart and bladeless deflector elements disposed along at least substantially co-planar longitudinal axes and adapted for deflecting without cutting a portion of clippings circulating in the cutting chamber while allowing passage between the deflector elements of other clippings circulating in the cutting chamber.

2. The mower deck of claim 1, wherein the deflector elements are adapted for collecting a portion of clippings circulating in the cutting chamber for reducing a velocity of clippings circulating in the cutting chamber.

3. The mower deck of claim 1, wherein the deflector elements are vertically aligned.

4. The mower deck of claim 1, wherein the deflector elements each have a different length.

5. The mower deck of claim 4, wherein the cutting chamber includes a roof and the longest deflector element is closer to the roof than the remaining deflector elements.

6. The mower deck of claim 5, wherein there are at least three deflector elements.

7. The mower deck of claim 1, wherein the deflector elements are elongate.

8. The mower deck of claim 1, wherein the deflector elements are cylindrical.

9. The mower deck of claim 1, wherein the deflector elements each have a longitudinal axis and the longitudinal axes extend approximately parallel to vertical.

10. The mower deck of claim 1, wherein the deflector elements each have a longitudinal axis and the longitudinal axes extend at an angle relative to vertical.

11. The mower deck of claim 1, wherein the deflector elements each have a longitudinal axis and the longitudinal axes extend approximately parallel to horizontal.

12. The mower deck of claim 1, wherein a distance of at least approximately two times the cross-sectional thickness of any one of the deflector elements separates the deflector elements.

13. The mower deck of claim 1, wherein the deflector elements are fixed relative to the cutting chamber.

14. The mower deck of claim 1, wherein the at least one blade is a mulching blade.

15. A lawnmower convertible between a mulching mode and a discharge mode, the lawnmower comprising:
(a) a deck including a skirt and a cutting chamber, the cutting chamber including a roof;
(b) a discharge chute opening into the cutting chamber;
(c) a blade rotatably mounted in the cutting chamber for cutting grass; and
(d) a deflector detached from the blade and comprising a plurality of spaced-apart and bladeless deflector elements disposed along at least substantially co-planar longitudinal axes and adapted for forming a single clippings barrier by deflecting without cutting a portion of clippings circulating in the cutting chamber while allowing passage between the deflector elements of other clippings circulating in the cutting chamber, the deflector elements extending across the blade at a position above the blade.

16. The convertible lawnmower of claim 15, further comprising a plug removably mounted in the discharge chute to cover the opening between the cutting chamber and the discharge chute when the lawnmower is in the mulching mode.

17. A method of mulching grass comprising:
(a) forming a single, semi-permeable barrier of clippings extending across a blade at a position above the blade and in a circulation path of a cutting chamber by deflecting without cutting a portion of clippings in the circulation path with a deflector detached from the blade and comprising a plurality of spaced-apart and bladeless deflector elements disposed along at least substantially co-planar longitudinal axes; and
(b) cutting the clippings diverted by the single barrier of clippings.

18. The method of claim 17, wherein the step of forming the single clippings barrier includes the step of collecting a portion of the clippings on the deflector elements.

19. A method of mulching grass comprising:
(a) providing a cutting chamber with at least one blade mounted in the cutting chamber for cutting grass;
(b) providing a deflector detached from the blade and mounted in the cutting chamber and extending across the blade at a position above the blade, the deflector being semi-permeable to clippings and comprising a plurality of spaced-apart and bladeless deflector elements disposed along at least substantially co-planar longitudinal axes and adapted for deflecting without cutting a portion of clippings circulating in the cutting chamber while allowing passage between the deflector elements of other clippings circulating in the cutting chamber; and
(c) deflecting without cutting a portion of clippings circulating in the cutting chamber above the blade to form a semi-permeable clippings barrier that collects a portion of the clippings circulating in the cutting chamber above the blade while allowing passage of other clippings between the deflector elements.

20. The method of claim 19, further comprising the clippings barrier reducing a velocity of clippings circulating in the cutting chamber above the blade.

21. The method of claim 20, wherein reducing a velocity of the clippings causes clippings to fall into a path of and be cut by the blade.

22. A mower deck comprising:
(a) a skirt defining a cutting chamber;
(b) at least one cutting blade mounted in the cutting chamber for cutting grass; and
(c) a deflector detached from the blade and comprising a plurality of spaced-apart and bladeless deflector elements disposed along at least substantially co-planar longitudinal axes, the deflector elements extending into a portion of the cutting chamber at a position above the blade, the deflector being adapted for forming a clippings barrier to control clippings circulating in the cutting chamber by deflecting without cutting a portion of clippings circulating in the cutting chamber while allowing passage between the deflector elements of other clippings circulating in the cutting chamber.

23. The mower deck according to claim 22, wherein the deflector is adapted for forming a clippings barrier adapted for reducing a velocity of clippings circulating in the cutting chamber whereby clippings can fall into a path of and be cut by the blade.

24. The mower deck according to claim 22, wherein each of the plurality of deflector elements is spaced apart a distance at least equal to twice a cross-sectional thickness of any one of the plurality of deflector elements.

25. The mower deck according to claim 22, wherein each of the deflector elements comprises a different length.

26. The mower deck according to claim 22, wherein the plurality of deflector elements comprises at least three deflector elements.

27. The mower deck according to claim 22, wherein the plurality of deflector elements comprises a plurality of elongated cylinders.

* * * * *